Figure 1A:
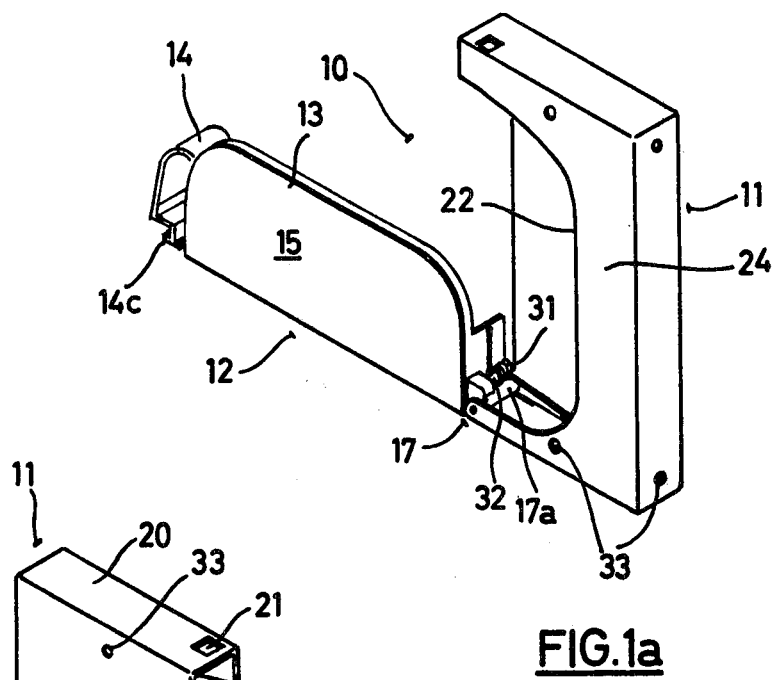

United States Patent [19]

Blankenmeister et al.

[11] 4,131,197
[45] Dec. 26, 1978

[54] CONTAINER FOR A CASSETTE CONTAINING A RECORDING TAPE, PARTICULARLY FOR A MAGNETIC-TAPE CASSETTE

[75] Inventors: Anton Blankenmeister, Boehl-Iggelheim; Ludwig Peinecke, Frankenthal; Dieter Koob, Worms, all of Fed. Rep. of Germany

[73] Assignee: BASF Aktiengesellschaft, Ludwigshafen, Fed. Rep. of Germany

[21] Appl. No.: 751,115

[22] Filed: Dec. 16, 1976

[30] Foreign Application Priority Data

Dec. 11, 1975 [DE] Fed. Rep. of Germany ....... 2555734

[51] Int. Cl.² .......................................... B65D 85/672
[52] U.S. Cl. .................................... 206/387; 220/326
[58] Field of Search .............. 206/387, 1.5; 220/324, 220/326

[56] References Cited

U.S. PATENT DOCUMENTS

| D. 223,739 | 5/1972 | Weiss | 206/387 |
| 2,967,638 | 1/1961 | Burman | 220/326 |
| 3,009,473 | 11/1961 | Hennen | 220/326 |
| 3,241,901 | 3/1966 | Waybright | 206/387 |
| 3,389,942 | 6/1968 | Jacob | 206/387 |
| 3,390,809 | 7/1968 | Becucci | 220/326 |
| 3,603,478 | 9/1971 | Connan | 206/387 |
| 3,763,994 | 10/1973 | Somers | 206/387 |
| 3,876,072 | 4/1975 | Phillips | 206/455 |
| 3,904,259 | 9/1975 | Hoffmann | 206/387 |

*Primary Examiner*—Ro E. Hart
*Attorney, Agent, or Firm*—Keil, Thompson & Shurtleff

[57] ABSTRACT

A container for a cassette containing a recording tape which container consists of a hollow portion, a support for the cassette and a lid portion. The design of the support and lid portion and the hinged connection between the same and the hollow portion are such that in the closed position of the container the latter is closed on all sides while in its open position the cassette is held securely but is readily removable.

7 Claims, 4 Drawing Figures

CONTAINER FOR A CASSETTE CONTAINING A RECORDING TAPE, PARTICULARLY FOR A MAGNETIC-TAPE CASSETTE

This invention relates to a container to accommodate a cassette containing a recording tape, in particular a magnetic tape cassette, which container consists of a hollow portion having substantially the shape of a rectangular parallelepiped and formed by two parallel side walls of relatively large area and four narrow walls connecting said side walls, at least one narrow wall being designed as a lid portion which has a cassette support comprising projections to prevent rotation of the reels in the cassette.

A cassette container of the above kind is known which comprises a drawer-like portion to accommodate the cassette, which portion is provided with locking projections for the cassette reels and is spring-loaded in the direction of the open position, which portion is slidably mounted in a housing which has the shape of a rectangular parallelepiped and which is open on one side to effect closure of said housing when the said drawer and housing portions are in their closed position. The outer surfaces of this known container are provided with profiles of dove-tail cross-section to facilitate shelfstorage of a number of containers.

The said known container is extremely expensive to produce on account of the narrow manufacturing tolerances required and is opened by pressure applied to the drawer portion in a direction opposite the opening direction to release the draw portion from the housing. The amount of high-grade plastics material required is also very high and the assembly of the container including insertion of the drawer portion over the preloading spring situated inside the container at its back wall is highly complicated and must be effected by hand or by the use of very complicated machines.

A protective container for a magnetic-tape cassette is also known in which the cassette accommodating portion containing the reel locking pins is hingedly swung into position between the walls of a housing having the shape of a rectangular parallelepiped and having two open sides so as to close two narrow sides of the container. Guide rails are required to guide the cassette accommodating portion during said pivotal movement. Manufacture is therefore too costly. The amount of plastics required is excessive. Furthermove, this known design does not permit stacking of the containers. No elements are provided for shelf-storage of the containers side by side.

A cassette container has also been described in which the lid portion not only comprises one of the long narrow sides of the rectangular container but also portions of those of the large-area walls of the container to complement corresponding portions of the housing to effect complete closure of the container in the closed position. The said lid portion has no locking pins for the reels in the cassette, which means that the type may unwind and thus suffer damage. Furthermore, the joints between the lid portion and the other parts of the container are too long to ensure dustfree enclosure of the cassette. In addition, narrow manufacturing tolerances are necessary to ensure that the closing operation of the container functions satisfactorily.

It is an object of the present invention to produce a container of the kind described above which is suitable designed for less costly manufacture of the individual parts and simple assembly thereof.

The invention relates to a container for the accommodation of a cassette containing a recording tape, in particular a magnetic tape cassette, consisting of a hollow portion having substantially the shape of a rectangular parallelepiped and formed by two parallel large-area side walls connected by four narrow walls, at least one narrow wall being designed as a lid portion which has a support for the cassette, which support includes projections to prevent rotation of the reels in the cassette, wherein the lid portion with said support can be swung out, from the hollow portion open on one side and the bottom end of the lid portion is provided with an appendage for holding the cassette during said pivotal movement, whilst the top end of the lid portion comprises a spring member which is arranged to cooperate with one of the other adjacent walls of the container when closing and opening the container and is also adapted to simultaneously hold the cassette in position.

The design of the container of the invention provides at least the following advantages: Very simple manufacture in one or two pieces by injection molding with minimum material consumption; very simple loading of the containers with cassettes and very simple assembly of the parts of the container (if manufactured in two parts); convenient one-hand opening of the container and removal of the cassette with one hand; shake-proof and dust-free storage of the cassette; and uncomplicated packing of the containers one above the other, side by side and/or one behind the other.

According to a further advantageous feature of the invention, the spring member may be integral with the top end of the lid portion, which means that it may be produced by simple injection molding. In another embodiment the spring member may be U-shaped, this providing simple and reliable operation of the spring.

According to a further advantageous embodiment, the spring member is provided with a catch for cooperation with a perforation, depression or internal projection provided on one of the adjacent walls of the hollow portion. In this way, the lid portion can be locked to the hollow portion in such a manner that there is no possibility of the container opening of its own accord.

A further embodiment of the container for accommodation of a cassette, in particular a magnetic tape cassette, consisting of a hollow portion having substantially the shape of a rectangular parallelepiped and formed by two parallel side walls connected by four narrow walls, at least one narrow wall being designed as a lid portion which has a support for the cassette provided with projections to prevent rotation of the reels in the cassette, consists, according to the invention, in that the support is at least a part of one of the large-area side walls of the hollow portion.

This provides a particularly advantageous container design as regards maximum saving of material.

A further simple design of the container is provided by mounting the lid portion including the support on a hinge arranged adjacent to the lower appendage of the lid portion.

According to the invention a spring may be provided between the lid portion and the hollow portion to urge the lid portion into its open position, this spring being preferably in the form of a tongue, advantageously integral with the container. This provides an advantageous container design as regards highly simple manufacture, minimum material consumption and optimum cassette accommodation with spring-loading of the lid portion in its direction of opening.

In a further advantageous embodiment, the container of the invention may be provided with a lid portion and support and a substantially U-shaped clamping spring attached thereto for gripping one of the narrow sides of the cassette.

Figure 1B:
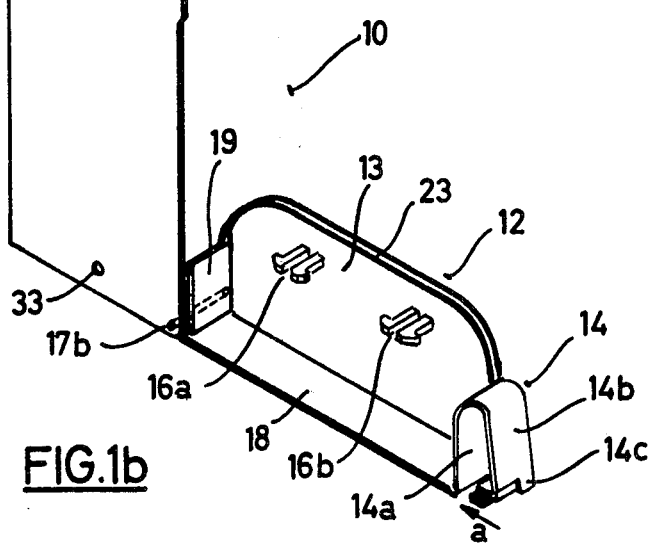
Figure 2A:
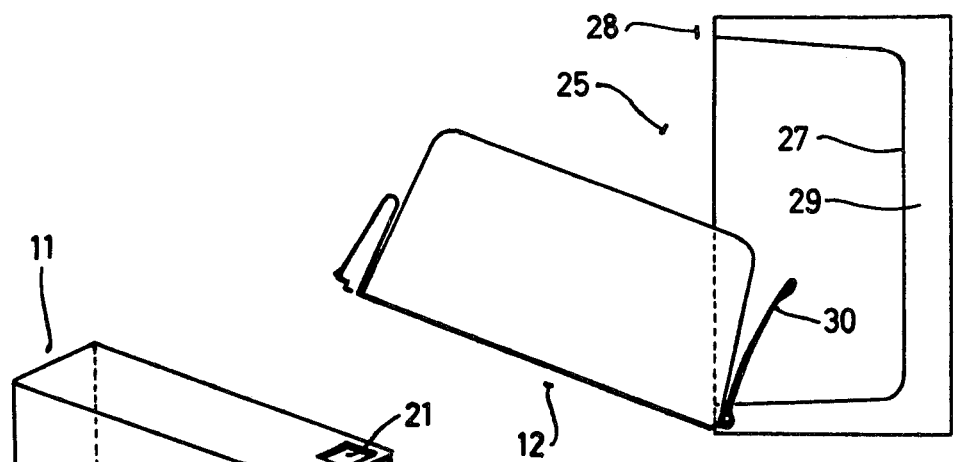
Figure 2B:
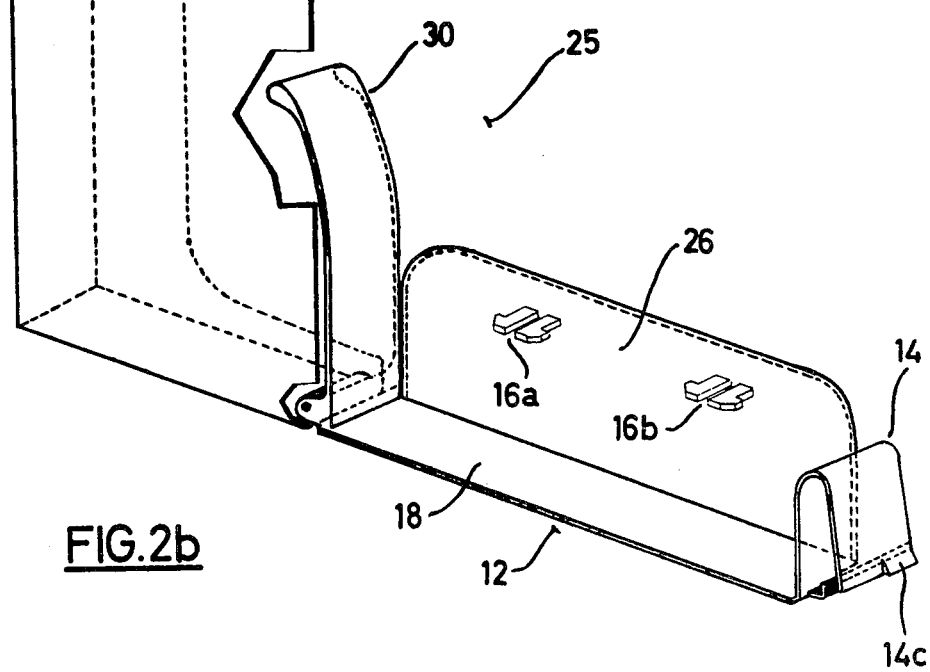

Further details of the invention are described below and are illustrated in the embodiments of the invention shown in the accompanying drawings, in which:

FIG. 1a shows a first embodiment of a container of the invention from one view point, FIG. 1b shows the container of FIG. 1a from a second view point, FIG. 2a shows a second embodiment of the container of the invention from a first view point and FIG. 2b shows the second embodiment of the container from a second view point.

The container 10 in FIGS. 1a and 1b essentially consists of the hollow portion 11 and lid portion 12, the latter comprising the support 13 and spring member 14.

FIG. 1a shows the lid portion 12 swung through 90° to its open position, the external wall 15 of the support 13 being visible. This support 13 is provided with locking pins 16a and 16b for the reels of a cassette, e.g. a compact cassette (not shown). The parts 11 and 12 are interconnected by a hinged joint 17 formed by a barrel 17a on the support 13 and ports in the hollow portion and an axle pin 17b inserted therein, but may of course be in any other suitable form.

One long narrow side of the lid portion 12 is formed by the lid wall 18. This wall 18 is provided at its top end with the spring member 14 which also serves to lock the lid portion 12 to the hollow portion 11. At the bottom end of the lid wall 18 is provided a retaining appendage 19 at right angles thereto. The cassette is accommodated, and possibly slightly gripped, between the internal surface of the appendage 19 and the internal surface of the arm 14a of spring member 14, the cassette being longitudinally disposed with its opposing narrow sides adjacent to said elements. The cassette may be positioned so that either its front or back abuts the inner surface of the lid wall 18.

The spring member 14 is advantageously an arcuate plastics spring, for example in the form of a U or parabola or of some other suitable shape. The free arm 14b may be moved against the spring action in the direction of the arm 14a of the spring member 14 (arrow a). When the lid portion 12 is swung into the hollow portion 11, the spring arm 14a rests resiliently against the upper narrow side 20 of the hollow portion 11 to close the container 10. In the closed position of the container 10 the catch 14c cooperates with the perforation 21. Pressure applied to the spring member 14 on the side opposite the catch 14c in the direction of the arrow a causes the spring arm 14b to disengage from the narrow side 20 of the hollow portion to release the catch 14c from the perforation 21 so as to allow the lid portion 12 to be swung out from the hollow portion 11. The cassette (not shown) can then be removed. The containers illustrated in FIGS. 1a, 1b and 2b are shown in the open position (lid portion 12 horizontal, hollow portion vertical). FIG. 2a shows a container 25 which is not fully open, the lid portion 12 being at an angle to the horizontal. In the following, like parts are provided with the same reference numerals as in FIGS. 1a and 1b. As a particular feature, the containers 10 and 25 have a support 13 and 26 respectively which has a shape (e.g. rounded corners) which fits, in the closed position of the container, in a similarly shaped cut-out 22 and 27 respectively in the hollow portion 11 and 28. As indicated in FIG. 1b by a flange 23 at the periphery of the support 13, the only parting line between the two portions of the container may be adequately sealed in the closed position to prevent the entry of dust. The wall portion 24 in which the cut-out 22 is provided is approximately C-shaped, but may be of any desired other shape. In FIG. 2a the wall portion 29 has a larger cut-out than in the other figures. It will be appreciated that the support may, if desired, be so large that it completely replaces the said wall portion in the closed position in the container.

In FIGS. 2a and 2b, a tongue-shaped spring 30 is provided at the bottom of the lid portion 18 to act as the retaining appendage and which is formed in such a manner that the following conditions are satisfied: Simple manufacture; automatic spring loading of the lid portion when closed; automatic assistance for opening the lid portion and retention of the inserted cassette.

The spring tongue 30 may be conveniently manufactured by injection molding. In FIG. 1a, automatic opening assistance is provided by a hair pin spring 1 on a pin 32 which is parallel to and above the bushing 17a. The hinged point of the containers 25 is, as shown in FIGS. 2a and 2b, designed like that shown in FIGS. 1a and 1b. However, it is advantageous to produce this hinged joint in the form of a so-called integral hinge by injection molding, in which case the assembly of separate parts of the container is obviated.

The container may be made of any suitable commercial plastics material. Perforations or recesses 33 in the walls of the container 10 in FIGS. 1a and 1b enable the containers described to be stored in shelves, using, for example, plug-in connecting elements. The design of the containers is such that they may be stacked in any desired way. The catch 14c must, of course, have a height which is less than the thickness of the wall 20.

Other embodiments of the containers are conceivable. For example, the spring element may take various other forms to ensure reliable closure of the container and enable it to be opened and closed with one hand, as is the case in all of the embodiments described above.

We claim:

1. A container for the accomodation of a cassette containing a recording tape wound on reels, and in particular a magnetic tape cassette, said container comprising:

a hollow portion having substantially the shape of a rectangular parallelepiped formed by two parallel large-area side walls connected by four narrow walls, a lid portion consisting of one of said narrow walls and having a support for the cassette which includes projections to prevent rotation of the reels in the cassette, said support being formed of at least a portion of one of said large-area side walls of said hollow portion, a means located at the bottom end of said lid portion for permitting the pivotal movement of said lid portion together with said support about the adjacent bottom end of said hollow portion whereby the lid portion and support may be swung out from the open container, a tab formed at the bottom end of said lid portion for engaging the cassette on said support during said pivotal movement, and a spring member formed at the opposite top end of said lid portion which is arranged to cooperate with one of the adjacent walls of said hollow portion when opening and closing the container from the lid portion side thereof and also being adapted to press the cassette on the support against said tab.

2. A container as claimed in claim 1 wherein the spring member is a tab integrally formed with said lid portion.

3. A container as claimed in claim 2 wherein the spring member is in the form of a U-shaped clamping spring which is positioned to press against the adjacent narrow side of the cassette when located on said support.

4. A container as claimed in claim 1 wherein the spring member has a catch formed thereon which cooperates with a perforation or depression formed in, or an internal projection formed on one of the adjacent walls of said hollow portion.

5. A container as claimed in claim 1 wherein the lid portion together with said support is mounted for pivotal movement about an axle adjacent to said bottom retaining tab.

6. A container as claimed in claim 1, wherein there is provided between the lid portion and the hollow portion a tongue-shaped spring member urging the lid portions into its open position.

7. A container as claimed in claim 6, wherein said tongueshaped spring member is of the same plastics material as the container and is integrally molded therewith.

* * * * *